(No Model.) 3 Sheets—Sheet 3.

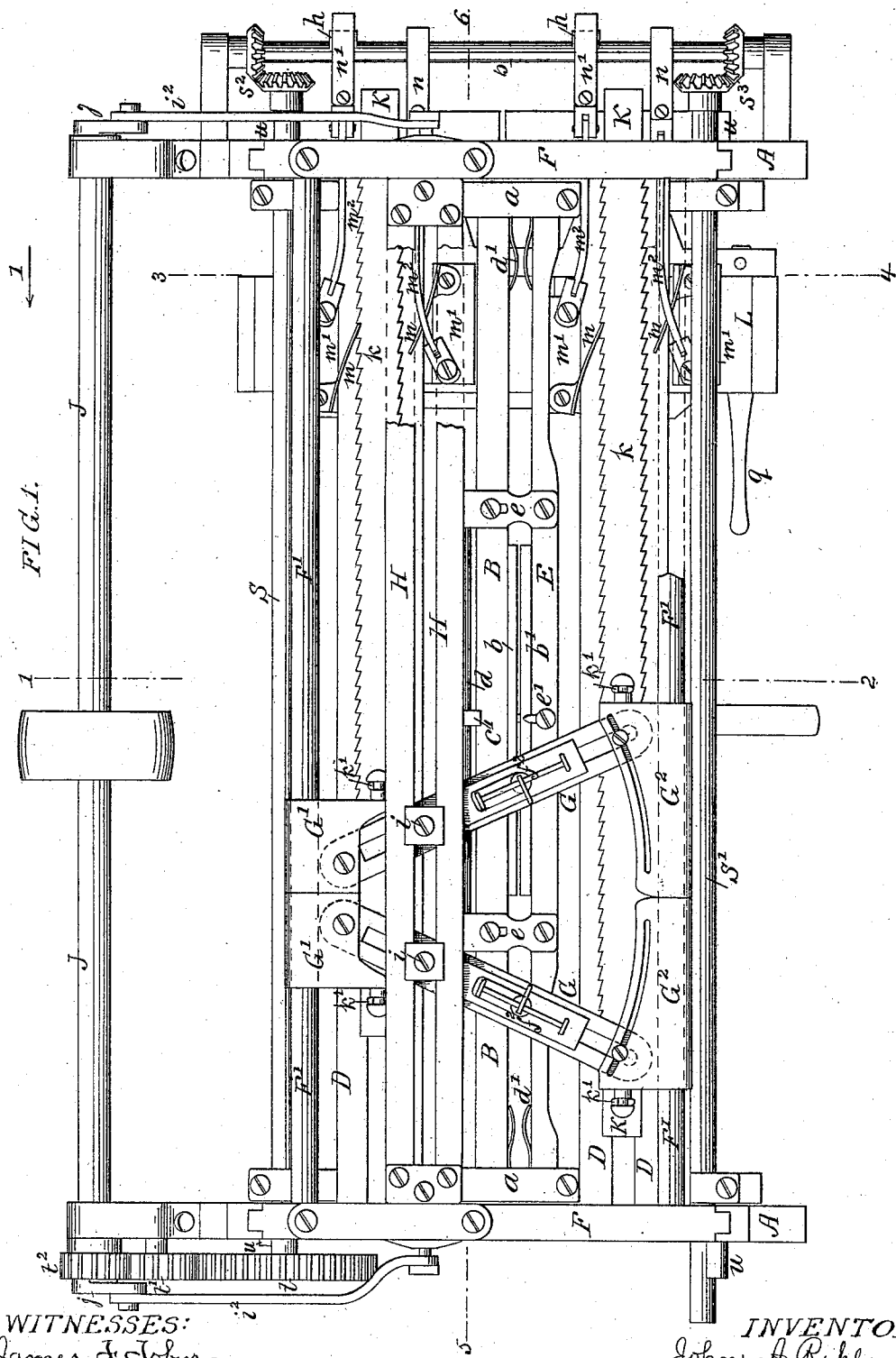

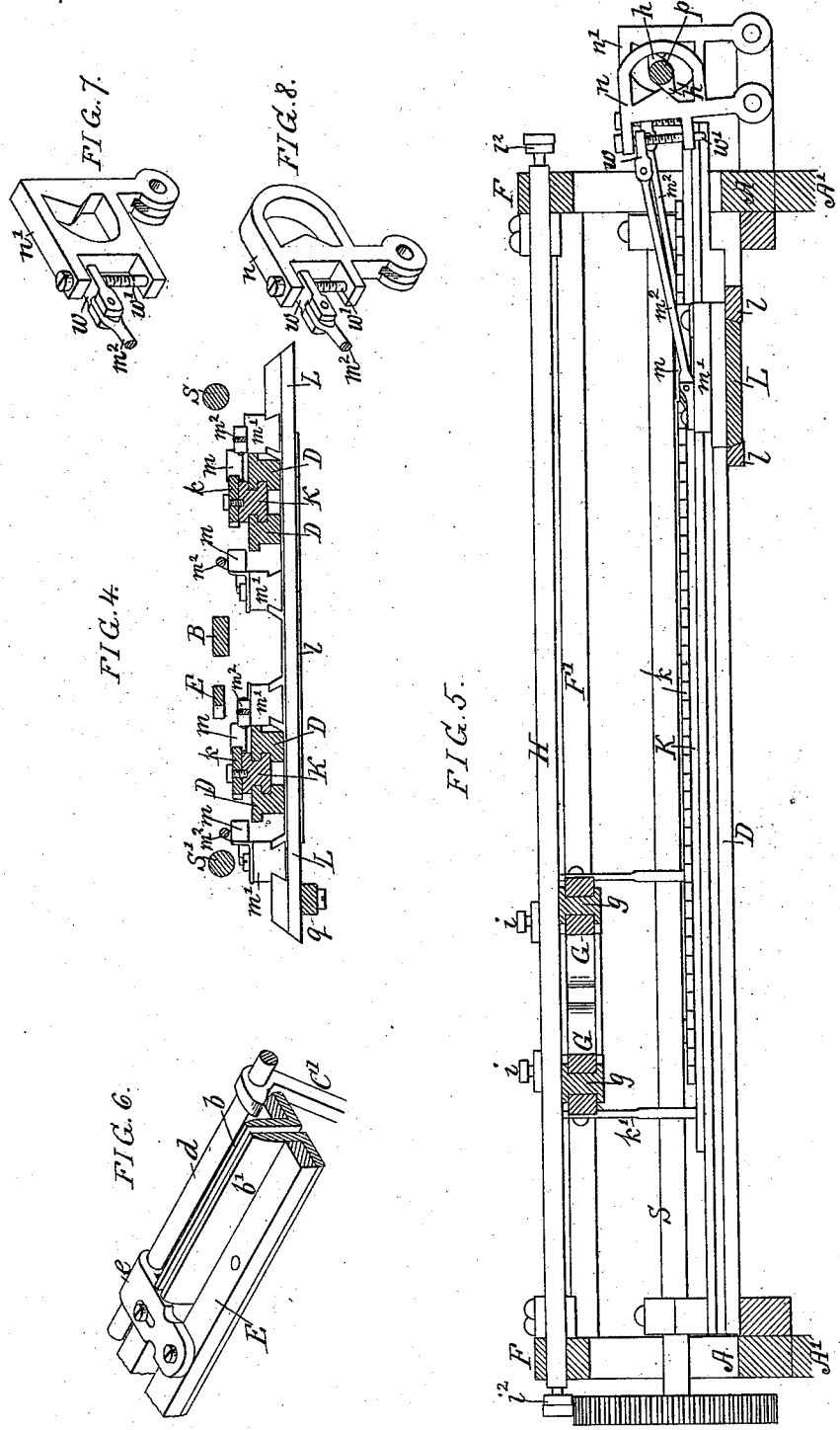

J. A. RIHL.
SAW FILING MACHINE.

No. 290,357. Patented Dec. 18, 1883.

WITNESSES:
James F. Tobin
Harry L. Ashenfelter

INVENTOR:
John A. Rihl
by his Attorneys
Howson & Sons

UNITED STATES PATENT OFFICE.

JOHN A. RIHL, OF PHILADELPHIA, PENNSYLVANIA.

SAW-FILING MACHINE.

SPECIFICATION forming part of Letters Patent No. 290,357, dated December 18, 1883.

Application filed May 28, 1883. (No model.)

*To all whom it may concern:*

Be it known that I, JOHN A. RIHL, a citizen of the United States, residing in Philadelphia, Pennsylvania, have invented certain Improvements in Saw-Filing Machines, of which the following is a specification.

The object of my invention is to construct a power-driven machine for rapidly filing the teeth of straight saws, the invention comprising certain features of construction, fully described hereinafter.

Figure 2:
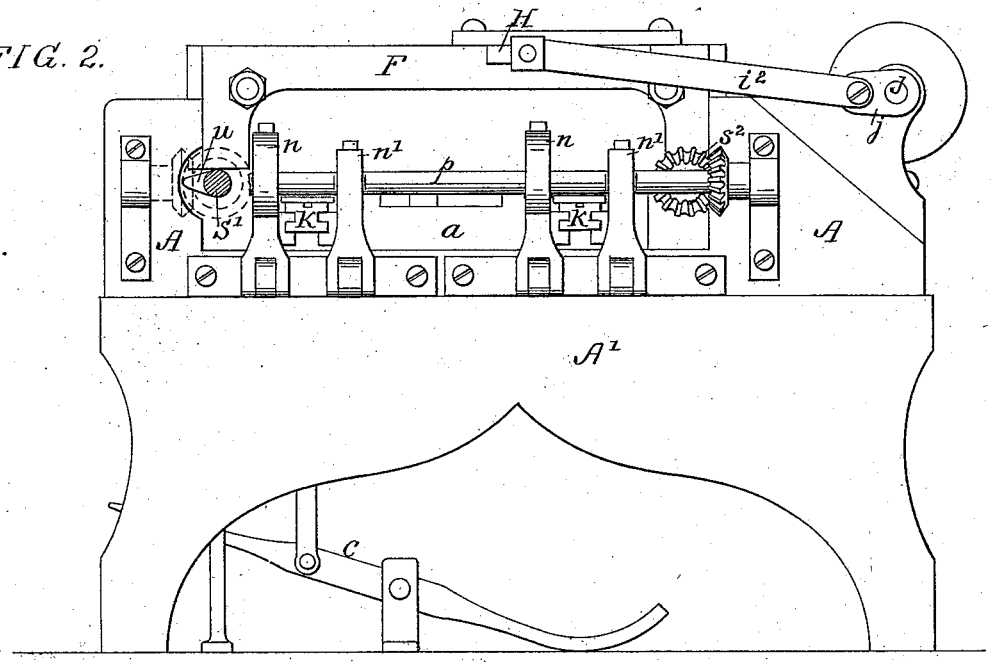
Figure 3:
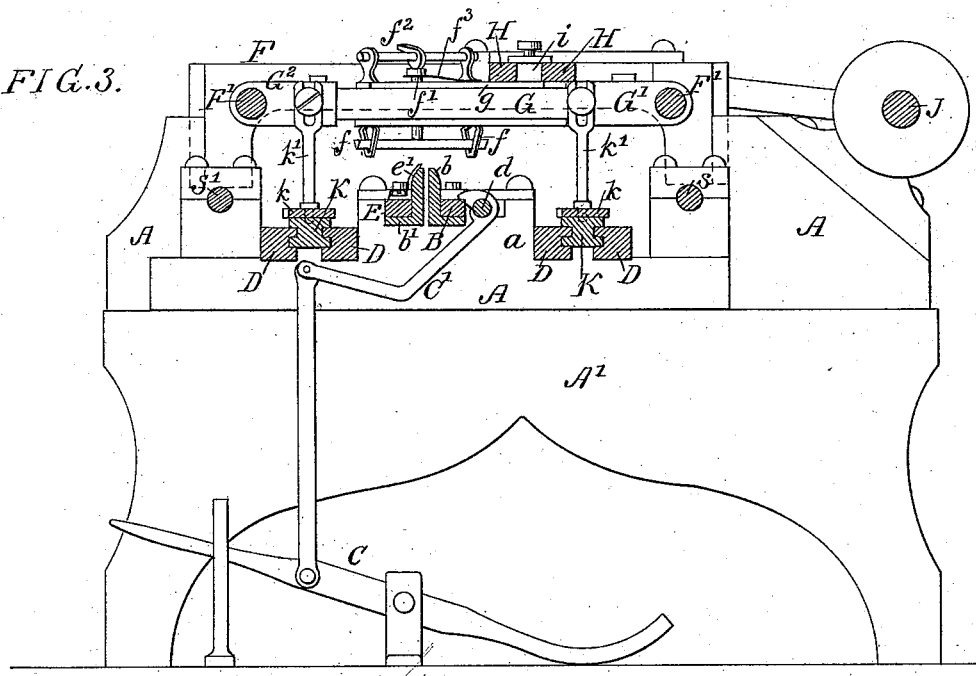

In the accompanying drawings, Figure 1, Sheet 1, is a plan view of my improved saw-filing machine; Fig. 2, Sheet 3, an end view, looking in the direction of the arrow 1; Fig. 3, a transverse section on the line 1 2, Fig. 1; Fig. 4, Sheet 2, a transverse section on the line 3 4, Fig. 1; Fig. 5, a longitudinal section on the line 5 6, Fig. 1; and Figs. 6, 7, and 8, detached perspective views of parts of the device.

A A are the opposite end frames of the machine, connected together by the bar B and guide-rails D D, described hereinafter, said frames being supported by suitable legs, A' A'. The bar B is attached to a block, $a$, on each frame A of the machine, and a bar, E, parallel with and adjoining the bar B, is free to slide transversely in slots in the blocks $a$. To these bars B and E are attached clamping-jaws $b\ b'$ for the reception of the saw to be sharpened. The bar E is moved toward the bar B by means of a lever, C', hung to a rod, $d$, and connected by a link to the treadle C. The rod $d$ is attached to the bar E by plates $e\ e$, so that when the treadle C is pressed down by the operator the short arm of the lever C' will bear against the bar B, and serve as a cam to force the rod $d$ backward and draw the bar E toward the bar B, so as to hold the saw firmly between the two bars, Figs. 3 and 6. Springs $d'\ d'$ are placed between the bars to force them apart when pressure is removed from the treadle, Fig. 1. A gage-finger, $e'$, on the bar E serves to facilitate the adjustment of the saw to the position necessary for the proper action of the files upon the teeth of the same. Above the bars B and E are the file-holders, which are carried by a frame, F, the latter being suitably guided on the frame A, and having a vertical reciprocating movement imparted to it, as described hereinafter.

The present machine is duplex—that is to say, it has two files, one acting on one side of one tooth, while the other is acting on the opposite side of another tooth, and the supports and guides for the file-holders comprise bars G G, pivoted to blocks G', and connected at the opposite ends to slotted blocks $G^2$, so that the bars G can be adjusted to any desired angle and secured in position after adjustment. The blocks G' and $G^2$ are carried by and are free to slide on longitudinal rods F', connected to the end frames, F, and each bar G is slotted for the reception of a slide, $g$, to hangers $f$, on which the file is fitted, said file being clamped in the hangers by means of a pin, $f'$, acted on by a cam, $f^2$, and spring $f^3$. (See Fig. 3.)

On the file-holders $g$ are blocks $i$, which are adapted to a slotted bar, H, extending longitudinally across the machine, this bar being guided on the frame F, and being reciprocated laterally by cranks $j$ on the driving-shaft J through the medium of the rods $i^2$. By this means the file-holders $g$ are caused to traverse the bars G, and are thus carried back and forth at the proper angle across the saw, the files being raised clear of the saw at intervals, owing to the action on the frames F of cams $u$, carried by shafts S S', which are driven from the shaft J through the medium of spur-wheels $t\ t'\ t^2$, counter-shaft $p$, and bevel-gears $s^2$ and $s^3$. (See Fig. 1.) The intermittent movement of the file-holders, so as to carry the files from tooth to tooth of the saw while said files are raised, is effected by means of pawls $m$ acting on racks $k$, which are secured to slides K, adapted to the guides D, these slides being connected to the blocks G' and $G^2$ by means of rods $k'$, slotted at the upper ends for the reception of pins on said blocks, so that while the latter can have no longitudinal movement independently of the slides, the vertical reciprocating movement of the blocks is not interfered with. Each rack $k$ is duplex—that is to say, it has right-handed teeth on one edge and left-handed teeth on the opposite edge, and two pawls $m$ are employed connection with each rack—one pawl for each set of teeth. The pawls are carried by plates $m'$, which are adapted to guides on a transverse bar, L, Figs. 1 and 4, and the latter is guided in ways $l$, carried by the guide-bars D, as shown in Fig. 5, so that by shifting the bar by means of a lever, $q$, either set of pawls may be thrown into gear, and the file-holders thus fed in either direction, as desired. The reciprocation of the pawl-carrying plates $m'$ is effected by cams $h$ on the shaft $p$, these cams acting on levers $n\ n'$, connected to the plates $m'$ by flexible rods $m^2$, so that the lateral movement of the plates will not interfere with the proper reciprocation of the same. The upper ends of the levers $n\ n'$ form yokes embracing the cams, whereby a positive movement in both directions is imparted to the said levers.

To regulate the throw of the plates $m'$ the outer ends of the rods $m^2$ are pivoted to nuts $w$, adapted to bolts $w'$ on the levers $n\ n'$, so that by turning these bolts the nuts may be adjusted nearer to or farther from the fulcrums of the levers. (See Figs. 5, 7, and 8.)

The shaft J is so geared to the shaft $p$ that there will be several passes of the file over each tooth of the saw, and the number of such passes can be readily governed by regulating the number of reciprocations of the bar H for each reciprocation of the pawl-carrying plates $m'$.

I claim as my invention—

1. The combination of the saw-clamp, a file-carrier, a frame, F F', supporting the same, means for vertically reciprocating the frame to raise the file from the teeth, mechanism for intermittently moving the file-carrier, so as to apply the file to tooth after tooth of the saw, and a slotted bar, H, adapted to receive a projection on the file-carrier, and combined with reciprocating mechanism, whereby the movement of the file across the teeth is effected, as set forth.

2. The combination of the bars K and means for intermittently moving the same, and a file-carrier and mechanism for vertically and laterally reciprocating the same, with slotted rods $k'$, forming a connection between the file-carriers and the bars K, as set forth.

3. The combination of the slide $g$ with hangers $f$, the pin $f'$, and cam $f^2$, as set forth.

4. The combination of a duplex rack-bar $k$, opposite plates $m'$, carrying pawls $m$, mechanism for reciprocating the plates, and means for throwing either pawl into gear, as set forth.

5. The combination of the duplex rack-bar $k$, opposite plates $m'$, carrying pawls $m$, mechanism for reciprocating the plates, and a laterally-adjustable bar, L, carrying said plates, as set forth.

6. The combination of the laterally-adjustable plates $m'$, the shaft $p$, with its cams $h$, the levers $n\ n'$, and the flexible connecting-rods $m^2$, as set forth.

7. The combination of the plates $m'$, the rods $m^2$, and the levers $n\ n'$, having screw-bolts $w'$, with nuts $w$, to which the rods $m^2$ are connected, as set forth.

8. The combination of the guided frame F F', the connected shafts S S', having cams $u$, and mechanism for rotating said shafts, as set forth.

In testimony whereof I have signed my name to this specification in the presence of two subscribing witnesses.

JOHN A. RIHL.

Witnesses:
HARRY L. ASHENFELTER,
HENRY HOWSON, Jr.